United States Patent
Johns et al.

(10) Patent No.: US 8,562,270 B1
(45) Date of Patent: Oct. 22, 2013

(54) LOADING ARRANGEMENT INCLUDING A DAM FOR CONFINING CATALYST AND OTHER PARTICLES ON THE TOP TUBESHEET OF A CHEMICAL REACTOR

(75) Inventors: Clifford L. Johns, Louisville, KY (US);
Dennis McAndrews, Jeffersonville, IN (US); Douglas K. Cornett, Louisville, KY (US)

(73) Assignee: Extundo Incorporated, Louisville, KY (US)

( * ) Notice: Subject to any disclaimer, the term of this patent is extended or adjusted under 35 U.S.C. 154(b) by 582 days.

(21) Appl. No.: 12/884,369

(22) Filed: Sep. 17, 2010

Related U.S. Application Data

(60) Provisional application No. 61/245,061, filed on Sep. 23, 2009.

(51) Int. Cl.
*B65G 25/00* (2006.01)
*F23K 3/00* (2006.01)

(52) U.S. Cl.
CPC ........................................ *F23K 3/00* (2013.01)
USPC ............ 414/160; 422/145; 422/219; 422/232

(58) Field of Classification Search
USPC ............ 141/125; 422/145, 219, 232; 414/160
See application file for complete search history.

(56) References Cited

U.S. PATENT DOCUMENTS

| | | | |
|---|---|---|---|
| 3,223,490 A * | 12/1965 | Sacken et al. ................. | 422/219 |
| 3,788,370 A * | 1/1974 | Hare et al. ..................... | 141/125 |
| 3,913,806 A * | 10/1975 | Red, Jr. ......................... | 222/429 |
| 4,192,359 A * | 3/1980 | Pippin ............................ | 141/12 |
| 4,402,643 A * | 9/1983 | Lytton et al. .................. | 414/160 |
| 4,442,716 A | 4/1984 | Coe et al. | |
| 5,114,685 A | 5/1992 | Sapoff | |
| 5,394,670 A * | 3/1995 | Visser ............................ | 53/249 |
| 5,439,103 A | 8/1995 | Howes | |
| 5,625,347 A | 4/1997 | MacLean et al. | |
| 5,897,282 A * | 4/1999 | Comardo ....................... | 414/160 |
| 6,164,891 A * | 12/2000 | De Marchi et al. ........... | 414/160 |
| 6,409,977 B2 | 6/2002 | Harper et al. | |
| 6,694,802 B1 | 2/2004 | Comardo | |
| 6,905,660 B2 * | 6/2005 | Harper et al. ................. | 422/232 |
| 6,981,404 B2 | 1/2006 | Johns et al. | |
| 7,255,139 B2 * | 8/2007 | Tochio et al. ................. | 141/125 |
| 7,285,251 B2 * | 10/2007 | Johns et al. ................... | 422/219 |
| 7,364,089 B2 | 4/2008 | Claessens et al. | |
| 7,661,447 B2 * | 2/2010 | Bailey et al. ................... | 141/12 |
| 7,765,948 B2 | 8/2010 | Johns et al. | |
| 7,836,919 B2 * | 11/2010 | Johns et al. ..................... | 141/1 |
| 2007/0098605 A1 | 5/2007 | Johns et al. | |

(Continued)

FOREIGN PATENT DOCUMENTS

| DE | 102005027060 | 12/2006 |
|---|---|---|
| EP | 0311712 | 4/1989 |

*Primary Examiner* — Timothy L Maust
(74) *Attorney, Agent, or Firm* — Camoriano and Associates

(57) ABSTRACT

A dam arrangement is provided for confining catalyst and other particles. The dam can be arranged in a wide variety of configurations. In one embodiment, blocks are provided that are releasably secured to the top tubesheet by means of magnets, and sheets are secured to the blocks to create a dam. In another embodiment, the blocks are releasably secured to the tubesheet by fasteners which project into the tops of some of the tubes and then lock into those tubes.

7 Claims, 11 Drawing Sheets

(56) References Cited

U.S. PATENT DOCUMENTS

| | | |
|---|---|---|
| 2008/0111685 A1 | 5/2008 | Olson et al. |
| 2008/0142045 A1 | 6/2008 | Johns et al. |
| 2008/0184779 A1 | 8/2008 | Johns et al. |
| 2008/0302388 A1 | 12/2008 | Johns et al. |
| 2009/0095211 A1* | 4/2009 | Johns et al. .................. 116/201 |
| 2009/0097958 A1 | 4/2009 | Johns et al. |
| 2009/0145727 A1* | 6/2009 | Johns ........................... 198/617 |
| 2010/0059137 A1 | 3/2010 | Johns et al. |

* cited by examiner

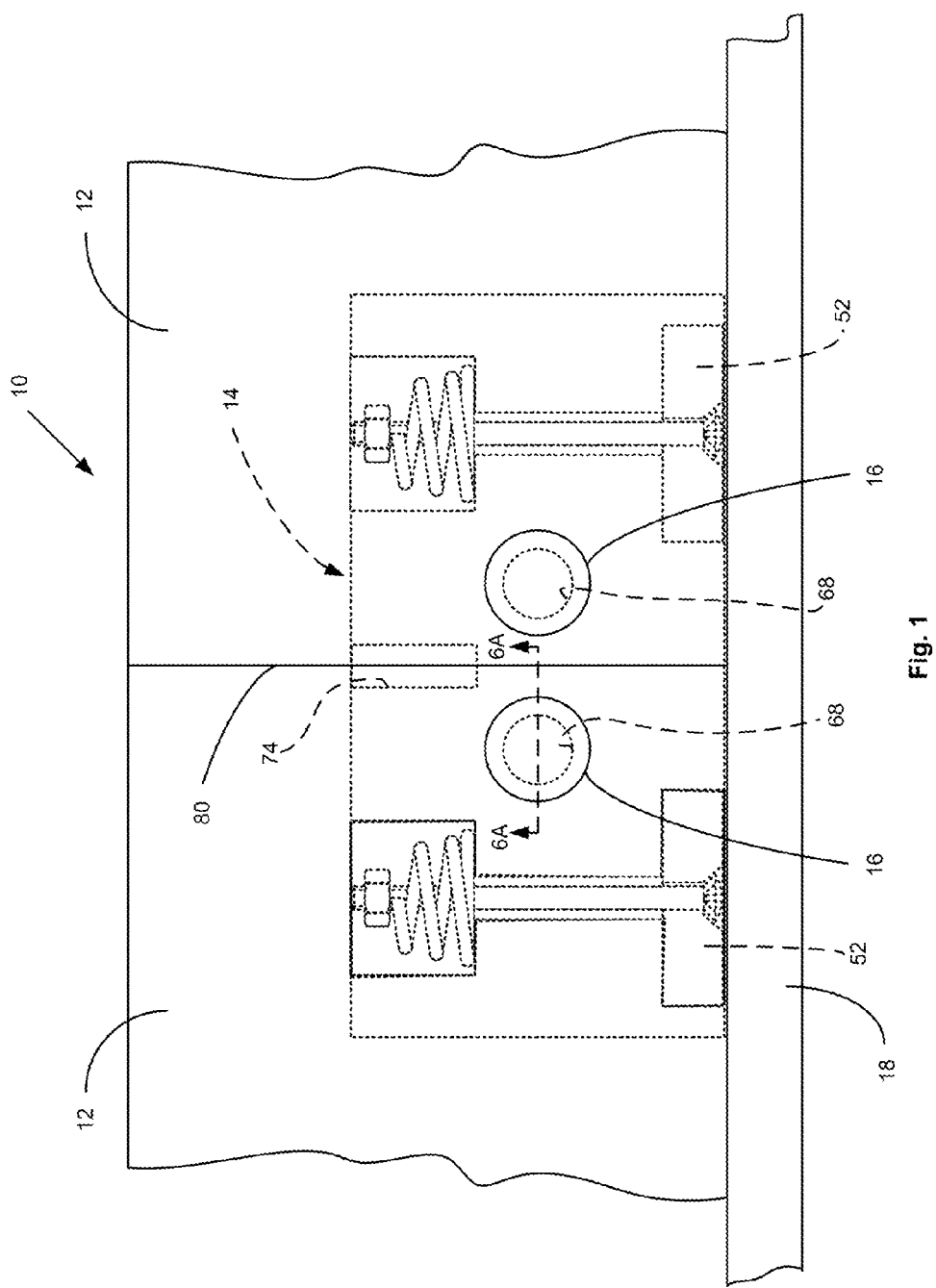

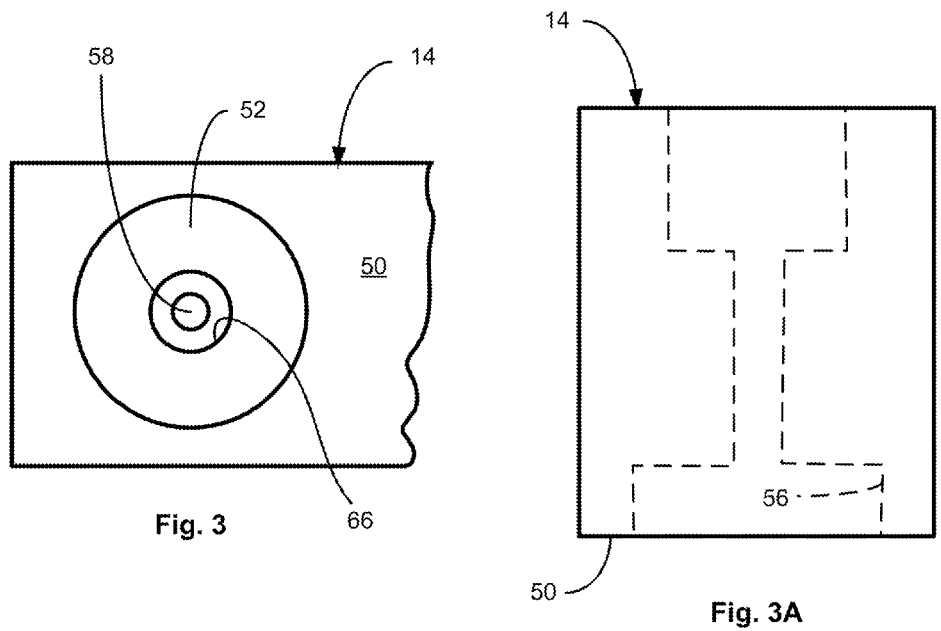
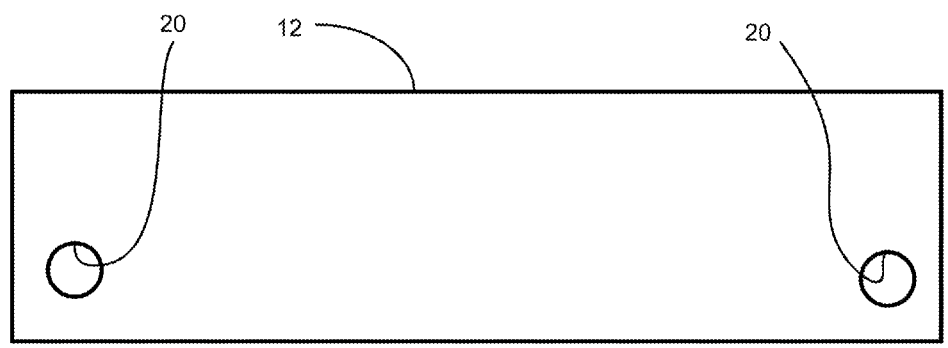

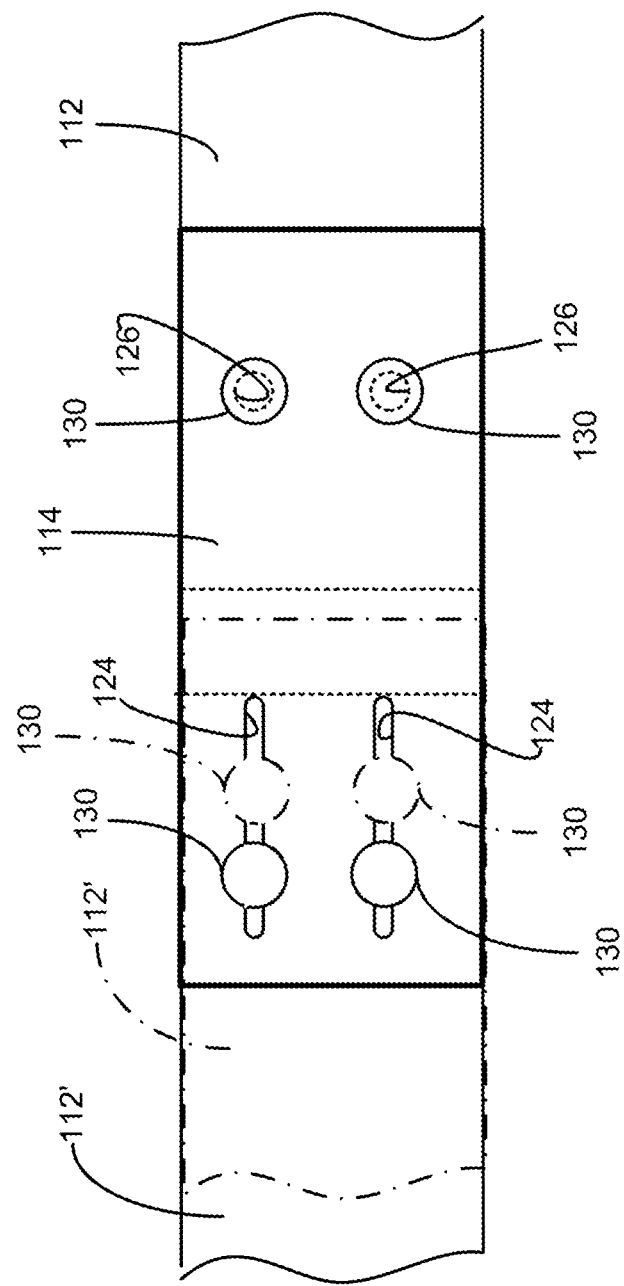

LOADING ARRANGEMENT INCLUDING A DAM FOR CONFINING CATALYST AND OTHER PARTICLES ON THE TOP TUBESHEET OF A CHEMICAL REACTOR

BACKGROUND

This application claims priority from U.S. Patent Application Ser. No. 61/245,061, filed Sep. 23, 2009, which is hereby incorporated herein by reference.

The present invention relates to the loading of catalyst and other particles into the vertically-oriented tubes of a chemical reactor that is in the form of a shell and tube heat exchanger. In many cases, it is desirable to be able to confine the catalyst to a particular area of the top tubesheet of the reactor, especially when the head has been removed from the reactor and there is nothing to prevent the catalyst from being swept off the side edges of the top tubesheet during loading. While some arrangements have been used in the past, none of them have been very satisfactory. They are bulky and difficult to handle; they trap catalyst, and so forth.

SUMMARY

The present invention provides a dam arrangement for confining catalyst and other particles that is simple, secure, light weight, easy to handle, and that can be arranged in a wide variety of configurations, each of which does not trap catalyst. In one embodiment, blocks are provided that are releasably secured to the top tubesheet by means of magnets, and sheets are secured to the blocks to create a dam. In another embodiment, the blocks are releasably secured to the tubesheet by fasteners which project into the tops of some of the tubes and then lock into those tubes.

BRIEF DESCRIPTION OF THE DRAWINGS

FIG. 1 is a broken away front view of an embodiment of an assembled dam arrangement;

FIG. 3 is a broken-away bottom view of the left portion of the block of FIG. 1;

FIG. 3A is a side view of the block of FIG. 1, with the bolt, nut, spring, and magnet removed for clarity;

FIG. 4 is a front view of the flexible sheet of FIG. 1;

FIG. 11 is a view along line 11-11 of FIG. 9.

DETAILED DESCRIPTION

Figure 1A:
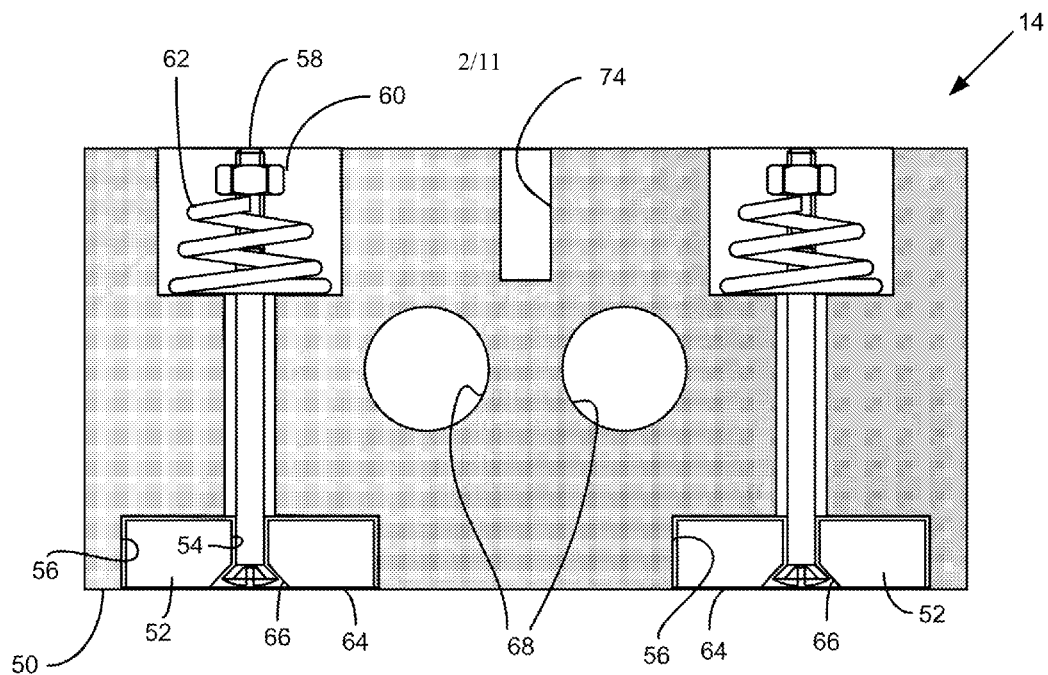
FIG. 1A is a front sectional view of the block used in the arrangement of FIG. 1.
Figure 7:
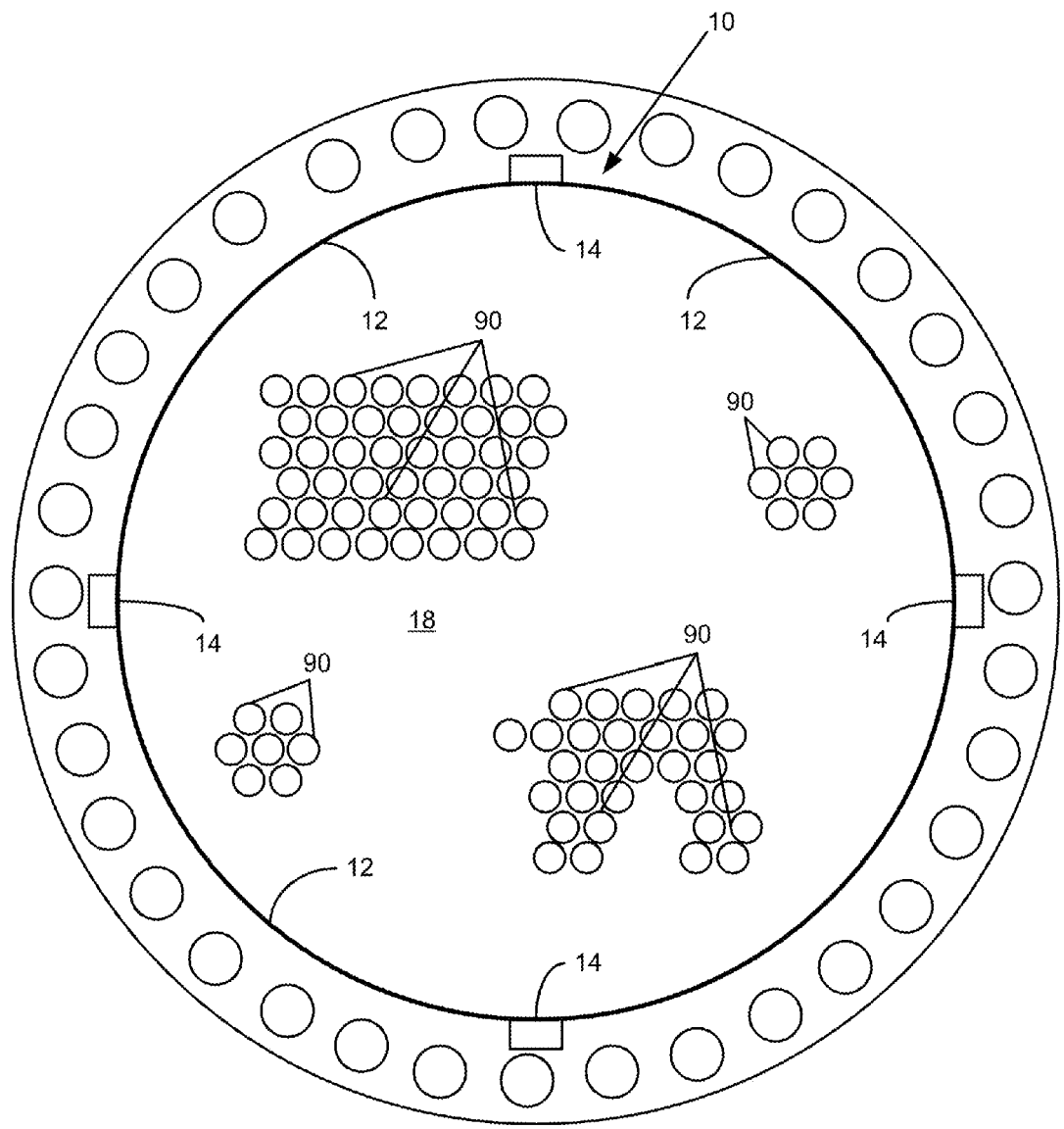
FIG. 7 is a schematic top view of a chemical reactor showing the dam arrangement of FIG. 1.

FIG. 1 is a broken-away front view and FIG. 7 is a top view of a dam arrangement 10. The dam arrangement 10 is made up of a plurality of flexible sheets 12, blocks 14, and connectors 16 supported on the top tubesheet 18 of a chemical reactor. The flexible sheets 12 in this particular embodiment are made of polyethylene that is about ⅛ inch thick, 6-12 inches high, and about 3-4 feet long. The sheets 12 are more flexible than the blocks 14, at least in the horizontal direction, which enables the sheets 12 to bend around a curve, as shown in FIG. 7. The sheets 12 are rectangular in shape, with flat bottom, top, left and right edges, and, as shown clearly in FIG. 4, they have through holes 20, extending through from their front surface to their rear surface. The through holes 20 receive the connectors 16. As described in more detail later, the blocks 14 (See also FIG. 1A) are releasably secured to the top of the tubesheet 18 via magnets 52. (In an alternative embodiment, the blocks are secured by fasteners).

Figure 5:
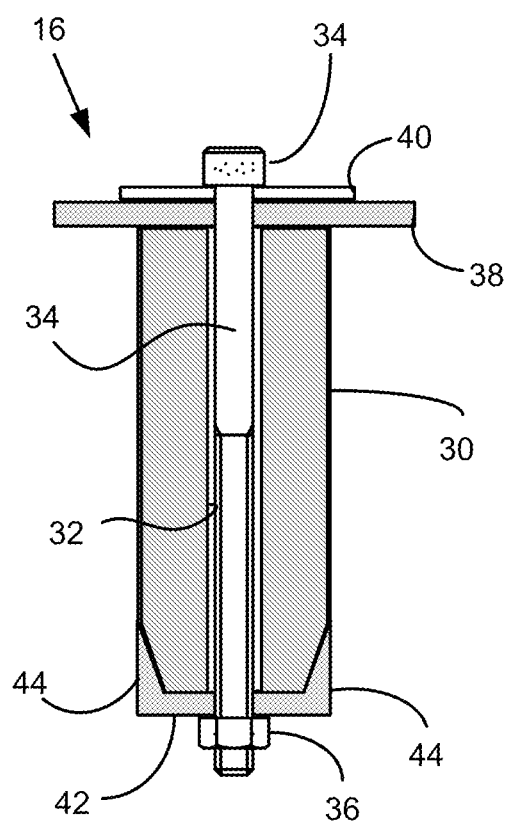
FIG. 5 is a section view of a connector used in the arrangement of FIG. 1.

One of the connectors 16 is shown in section in FIG. 5. It is made up of a cylindrical piece of flexible rubber-like material 30 having a cylindrical hole 32 extending through its axis. A cap screw 34 extends through that axial hole 32 and threads into a nut 36. At one end of the rubber cylinder 30 are a large washer 38 and small washer 40, and at the other end is a circular plate 42 with a plurality of teeth 44 projecting toward (and digging into) the flexible cylinder 30. One of the advantages of this connector 16 is that it will not come apart accidentally, so there will not be any small pieces that could become separated from the connector 16 and fall into a reactor tube. While this particular connector 16 has been selected for convenience, there is a wide range of known connectors that could alternatively be used for securing the flexible sheets 12 and blocks 14 together.

FIGS. 1-3A show one of the blocks 14. The block 14 is rectangular in top view (FIG. 2), rectangular in side view (FIG. 3A), and rectangular in front view (FIGS. 1 and 1A). It has a planar bottom surface 50, which rests on the planar top surface of the tubesheet 18, and it is held in a fixed position on the tubesheet 18 by means of magnets 52. The magnets 52 are cylindrical in shape and have an axial opening 54. Each magnet 52 rests in a cylindrical recess 56 (See also FIG. 3A) in the bottom surface 50 of the block 14. Each magnet 52 is secured to the block 14 by means of a bolt 58, nut 60, and spring 62, which allow the magnet 52 to "float" relative to the block. The block 14 preferably is made of a non-ferromagnetic material, such as aluminum or plastic, so the magnet 52 is attracted to the tubesheet 18 and not to the block 14. The spring 62 pushes the block 14 downwardly relative to the magnet 52 to ensure that the planar bottom face 50 of the block 14 is flat against the tubesheet. That is, the spring 62 acts as a biasing member to allow the magnet 52 to move relative to its respective block 14 in a direction substantially perpendicular to the tubesheet 18. Each magnet 52 has a recess 66, which receives the head of the bolt 58 so the head does not interfere with the contact between the magnet 52 and the tubesheet 18.

Figure 2:
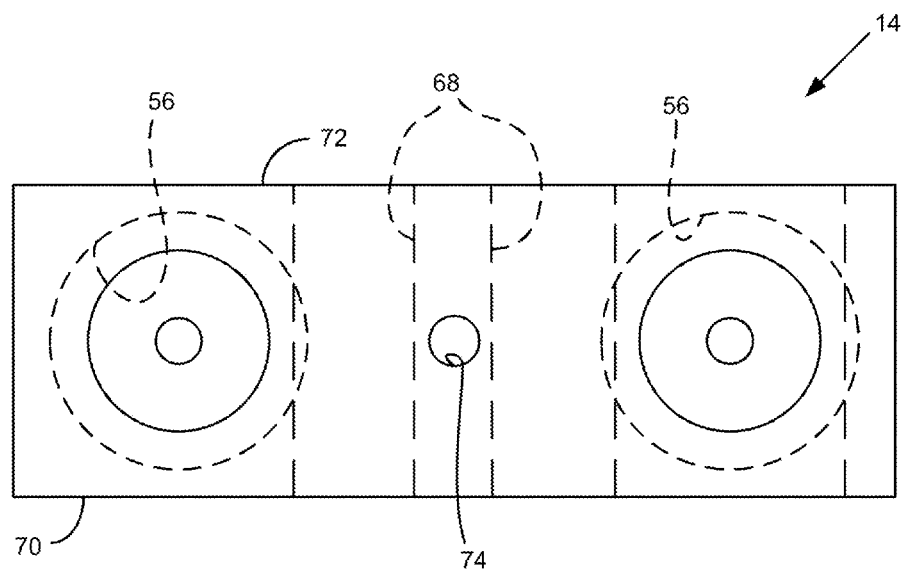
FIG. 2 is a top view of the block of FIG. 1.

Referring to FIG. 2, each block 14 has two through holes 68 extending from its front surface 70 to its rear surface 72. These holes 68 are sized and positioned so they align with the respective holes 20 (See FIG. 4) in the flexible sheets 12 when the block 14 and flexible sheets 12 are resting on the tubesheet 18 with the ends of the flexible sheets 12 nearly abutting each other, as shown in FIG. 1. Each block 14 also has a central vertical hole 74, which is used to remove the block 14 from the tubesheet 18 as is described below.

Figure 9:
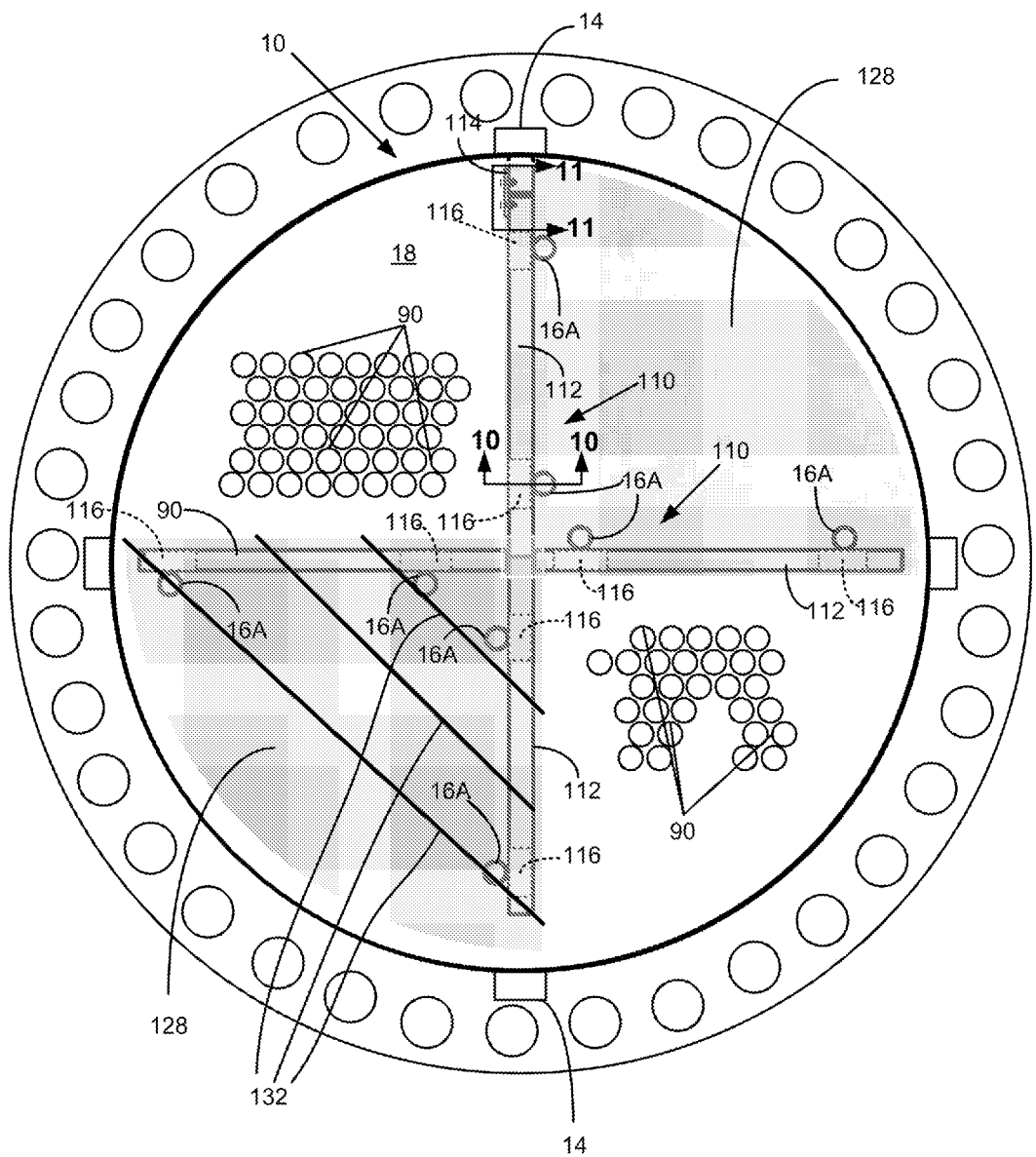
FIG. 9 is a schematic top view of a chemical reactor showing yet another embodiment of a possible dam arrangement.
Figure 10:
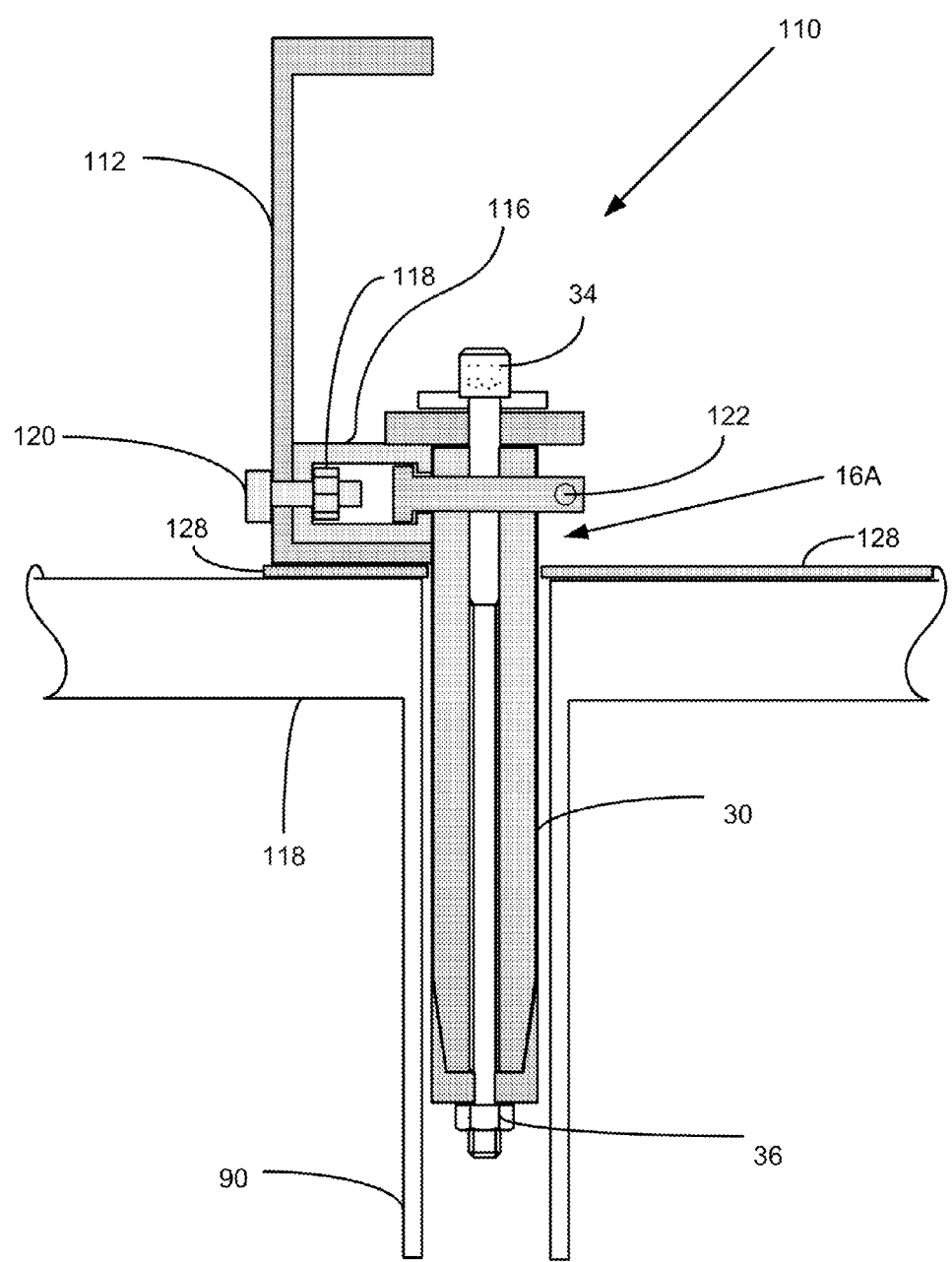
FIG. 10 is a view along line 10-10 of FIG. 9.

It should be noted that the blocks 14 and flexible sheets 12 may be resting directly on the tubesheet 18, as shown in FIG. 1, or on a mat which in turn rests on the tubesheet 18. The mats are described later, with respect to another embodiment of a dam arrangement 110, as shown in FIGS. 9 and 10. If a mat is used, the magnets 52 in the blocks 14 may be strong enough to magnetically secure the block 14 to the tubesheet 18 through the thickness of the mat, or there may be openings in the mat sized a bit larger than the diameter of the magnets 52 to allow the magnets 52 to extend through the mat to reach the tubesheet 18, or there may be openings in the mat sized a bit larger than the footprint dimensions of the blocks 14 to allow the magnets to reach the tubesheet 18.

Figure 6A:
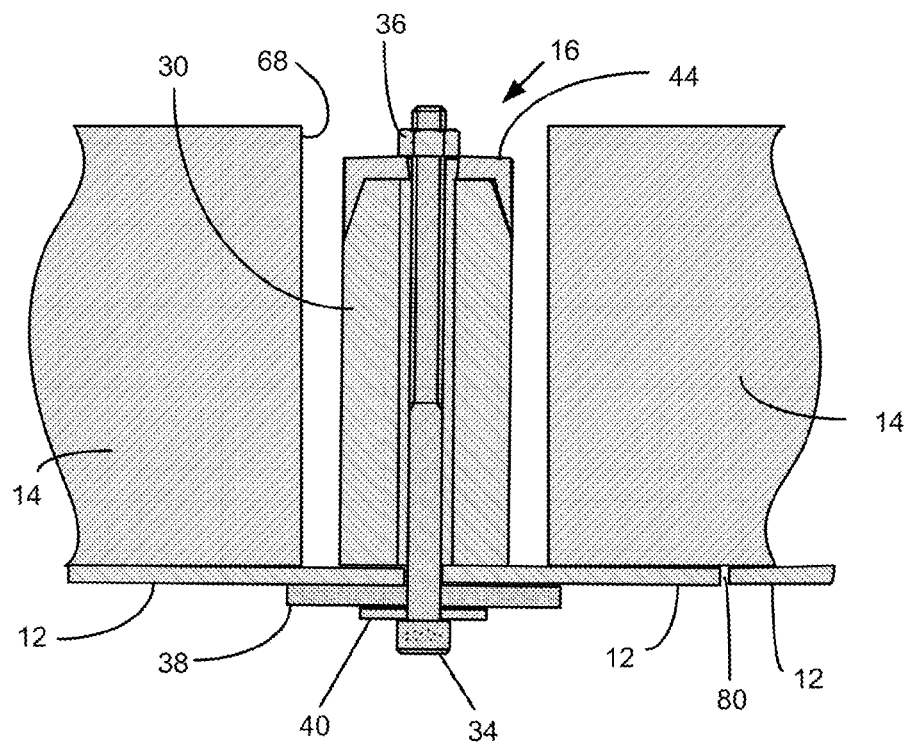
FIG. 6A is a broken away section view along line 6A-6A of FIG. 1, showing the connector in its non-expanded condition.
Figure 6B:
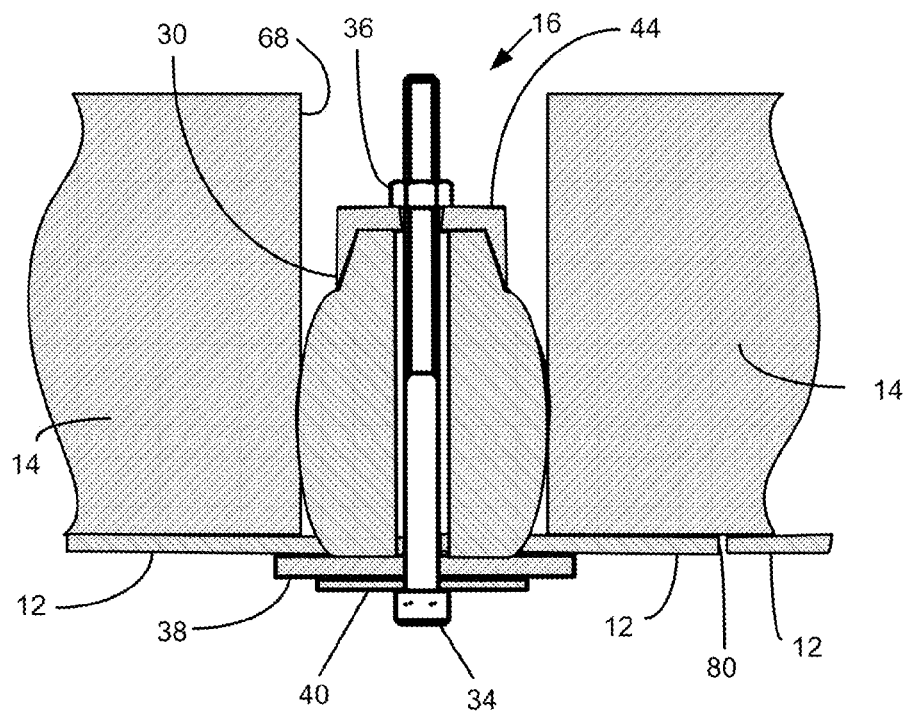
FIG. 6B is the same view as FIG. 6A, but with the connector shown in its expanded condition.

To assemble a dam arrangement 10, the flexible sheets 12 are secured to the blocks 14 by means of the connectors 16, and the blocks 14 are placed onto the tubesheet 18 in the desired locations. The connectors 16 are inserted through the aligned holes 20, 68 in the flexible sheets 12 and the blocks 14, respectively, and then are tightened, by threading the bolt 34 into the nut 36, so the flexible rubber element 30 is compressed in the axial direction, causing it to expand in the radial direction, as shown in FIG. 6B, so the connector 16 grips the respective sheet 12 and block 14, securing them together.

The magnets 52 provide a magnetic force to hold the blocks 14 securely in place on the tubesheet 18, and the flexible sheets 12 then provide a clean vertical surface that is essentially continuous, having only very small seams 80 (See FIGS. 1 and 6B) where the ends of the flexible sheets 12 come together. The gaps between the ends of the flexible sheets 12 at those seams 80 are less than the smallest dimension of the catalyst or other particles that are to be loaded into the reactor tubes so the dam arrangement 10 forms an effective border or dam that prevents the particles from passing through. In this particular embodiment, the gap between the ends of two adjacent flexible sheets 12 at the seam 80 is less than ¼ inch. Also, the sheets 12 are in close enough contact with the tubesheet 18 that the particles cannot pass between the sheets 12 and the tubesheet 18. The height of the sheets 12 above the top surface of the tubesheet 18 preferably is at least six times the largest dimension of the particles in order to help ensure that the particles will not fall over the top of the dam as they are being brushed across the tubesheet 18.

It is known in the art to use templates or loading sleeves that effectively reduce the diameter of the opening into the reactor tubes in order to control the flow of particles into the tube to minimize bridging of the particles inside the tubes. An example of a loading sleeve is shown in U.S. Pat. No. 7,458,401, which is hereby incorporated herein by reference. If loading sleeves are used, they will be inserted into the tubes before pouring the particles onto the tubesheet. Similarly, if templates are used, they will be placed on top of the tubesheet before pouring the particles onto the tubesheet.

Once the dam arrangement 10 has been assembled on the tubesheet 18 to define a border for the area to be loaded with particles, and any loading sleeves or templates are put into place, if desired, then the particles are poured onto that area and are spread out onto the tubesheet 18 on the front side of the dam. Then the particles are brushed across the tubesheet 18 until they fall into the tubes 90 (See FIGS. 7 and 8). A squeegee with a long handle or some other tool may be used to brush the particles across the tubesheet 18, if desired.

Once the tubes 90 have been loaded with particles, the dam arrangement 10 is removed. The loading sleeves or templates also would be removed at this time, if they are used.

Figure 1B:
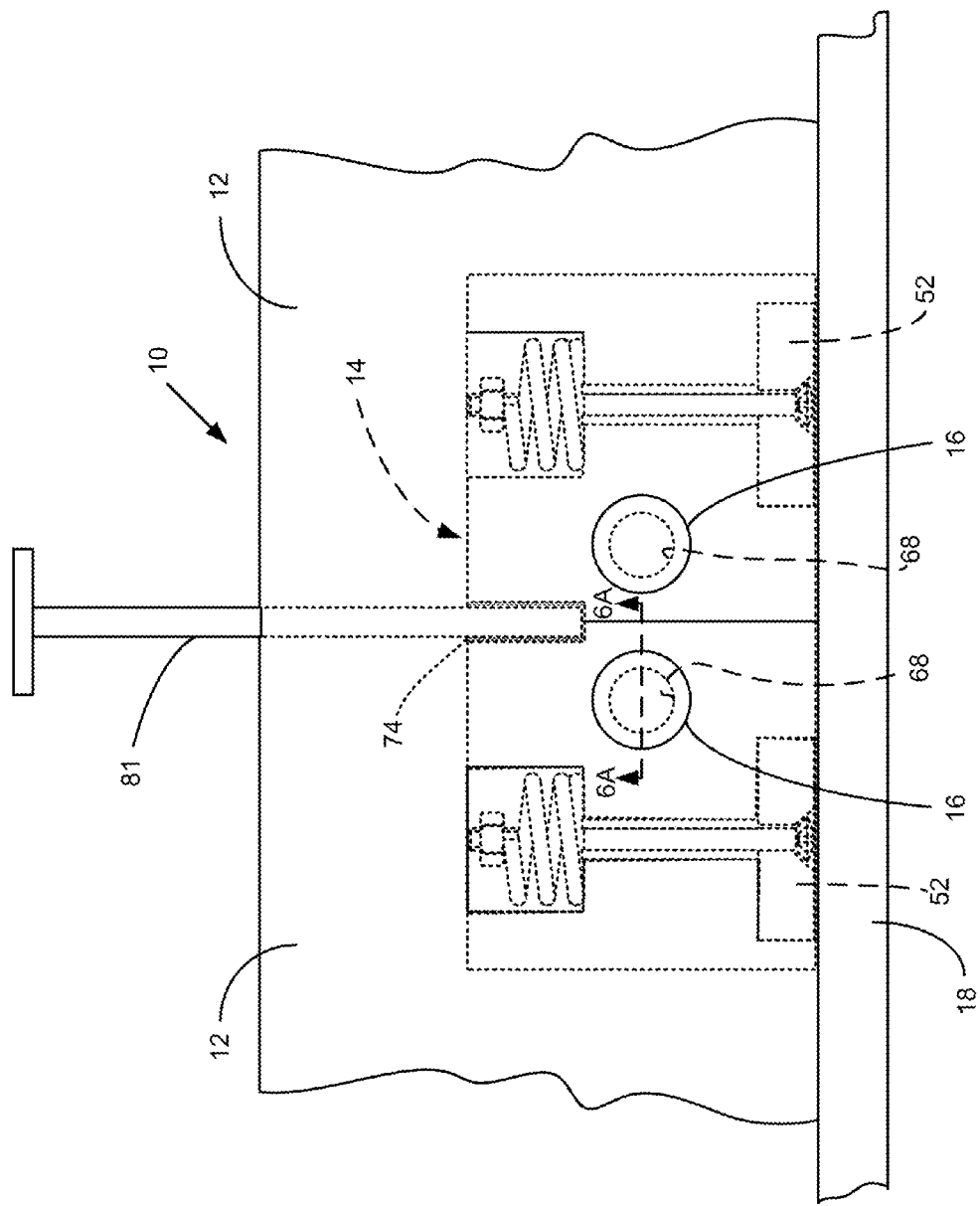
FIG. 1B is a front view, similar to that of FIG. 1, but also showing a rod that may be used to remove the dam from the reactor.

The dam arrangement 10 is removed by inserting a long cylindrical rod 81 as shown in FIG. 1B into the central hole 74 of each block 14 and using the rod 81 as a lever arm, pushing the upper end of the rod either forward or backward to tilt the block 14 relative to the tubesheet 18 so the magnets 52 are tilted out of contact with the tubesheet 18, thereby reducing the magnetic force holding the blocks 14 onto the tubesheet 18 so the blocks 14 can be picked up off of the tubesheet 18.

Then the fasteners 16 can be removed and the flexible sheets 12 can be disassembled from the blocks 14, if desired. The rod 81 has a cross-piece welded to it at its upper end to form a T-shape, with the cross-piece being larger than the inside diameter of the reactor tubes so the rod 81 cannot fall down into one of the reactor tubes. Similarly, it should be noted that the washers 38 (See FIG. 5) of the connectors 16 are larger than the diameter of the tubes 90 on the tubesheet 18 and are always on the connectors 16, so that, if the connectors 16 become separated from the assembly and fall onto the tubesheet 18, they will not fall into a tube 90. Of course, the blocks 14 and sheets 12 also are too large to fall into a tube 90.

Figure 8:
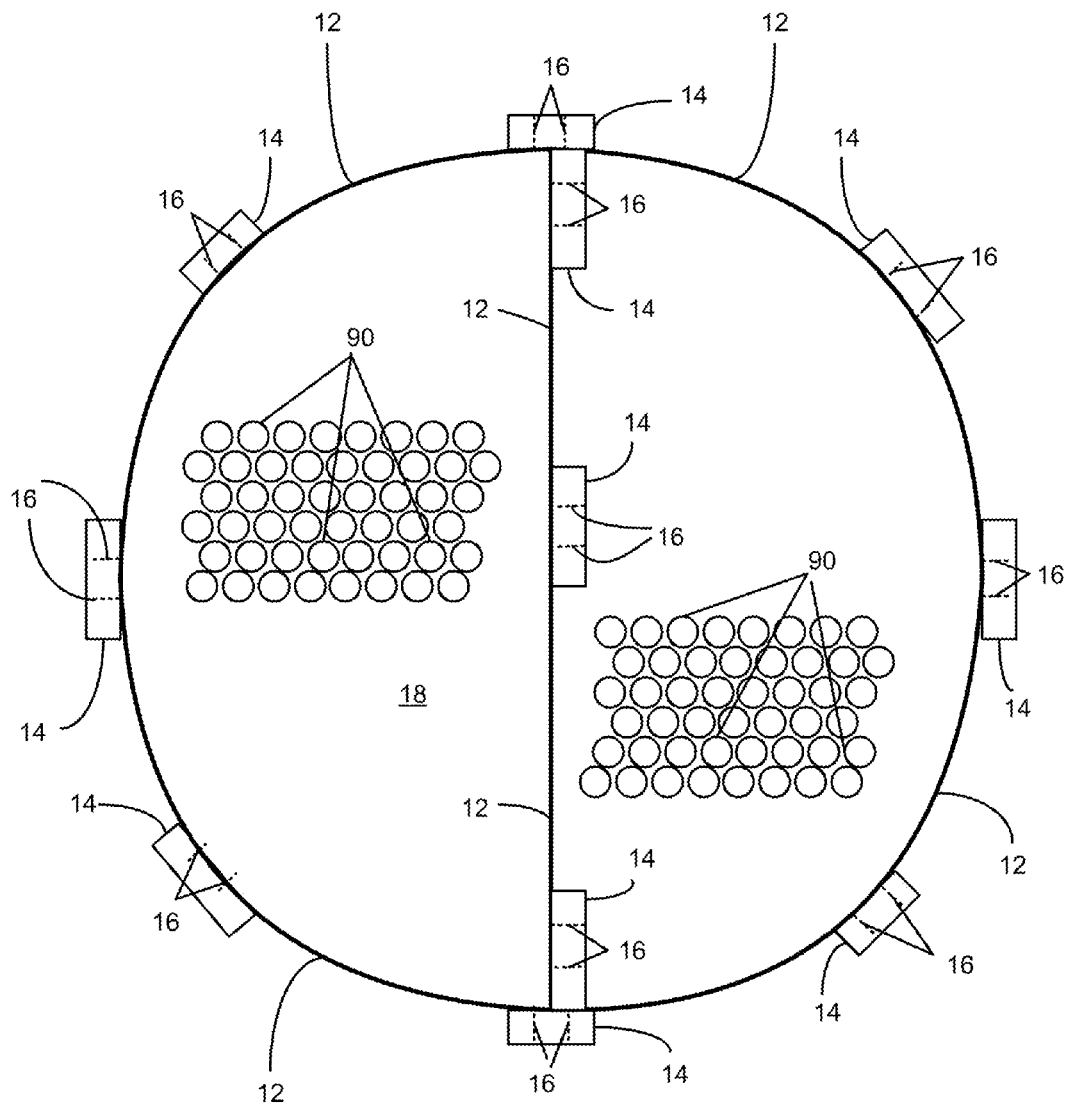
FIG. 8 is another schematic top view of a chemical reactor, showing another possible dam arrangement.

FIGS. 7 and 8 show some possible ways the dam arrangement may be arranged on the top tubesheet 18 of a shell and tube chemical reactor. It will be obvious to those skilled in the art that other embodiments of dam arrangements can be made and that other geometries besides round and pie-shaped can be done without departing from the scope of the present invention. In FIG. 7, the head of the reactor has been removed. In this case, there may be nothing to prevent the catalyst or other particles from being swept off the outer edge of the top tubesheet 18 unless a dam arrangement is used. In the arrangement of FIG. 7, the blocks 14 and flexible sheets 12 have been arranged to form a complete circle around the perimeter of the tubesheet 18 outside of the area of the vertical reactor tubes 90. This confines the particles to the area inside that circle.

It is preferred that the dam elements that can come in contact with the particles have a very smooth surface and that the surface be as continuous as possible in order to permit particles to slide or easily be brushed alongside them to minimize abrasion, reduction, and breakage of the particles, which may be very fragile. This also reduces the amount of force that is required to move the particles along the dam. FIG. 8 shows a first dam forming a circle around the perimeter of the reactor as in FIG. 7, and it also shows a second dam extending along a diameter of the reactor, dividing the tubesheet 18 into two halves. Of course, the dam arrangement 10 may be laid out in a variety of configurations, as desired for optimum loading of the reactor tubes 90. In the arrangement shown in FIG. 8, a mat (not shown, but disclosed later with respect to another embodiment of a dam arrangement 110 in FIGS. 9 and 10) is first placed so as to cover a first half of the tubesheet of the reactor, while catalyst particles are poured on the uncovered second half of the tubesheet and are loaded onto the tubes in the second half. Then, the mat is lifted from the first half of the tubesheet and is moved over to lie on top of the second half, providing a surface for workers to walk over as they load the first half, as well as protecting the particles in the tubes that have already been loaded. Sleeves or templates may be used for loading the first half, as described with respect to the loading of the second half.

FIG. 9 shows the top tubesheet 18 of a reactor with a different embodiment of a dam arrangement 110, as well as with the dam arrangement 10 of FIG. 7. As explained in more detail below, the dam arrangement 110 includes sheets 112 that are more rigid than the sheets 12 described earlier. These sheets 112 are releasably secured to the top tubesheet 18 via blocks 116 with fasteners 16A, such as the fastener 16A depicted in FIG. 10 (which is substantially identical to the connector 16 of FIG. 5). It should be noted that other fasteners may be used to releasably secure the dam arrangement 110 to the top tubesheet 18. For instance, the magnetically operated blocks 14 of FIGS. 1-3A may be used instead of, or in addition to, the fasteners 16A. Inflatable tube seals (not shown) as disclosed in U.S. Pat. No. 6,725,606, hereby incorporated herein by reference, may be used instead of, or in addition to, the fasteners 16A.

Referring now to FIGS. 9 and 10, the dam arrangement 110 includes a more rigid sheet 112, such as a fiberglass "C" channel. In this embodiment, the sheet 112 has a thickness of at least one quarter of an inch. Preferably these sheets 112 are 4 to 6 feet long for ease of transportation and handling. If a length of the sheet 112 is required which is longer than the 4 to 6 foot length, two or more of the lengths may be spliced together with a connecting channel 114 as described in more detail later.

The block 116 includes a short length of strut (See FIG. 10), such as an aluminum extrusion strut, which is secured by nuts and bolts 118, 120 (See FIG. 10), to the sheet 112. The fastener 16A is secured to the strut 116 (and therefore to the sheet 112) via a channel mount cushion clamp 122, such as the Fastenal Cush-A-Clamp manufactured by ZSI, Inc of Winona, Minn. (Various types of connectors or fasteners may be used instead, or the parts may be formed as a unit). The final location of the fastener 16A relative to the sheet 112 may be readily adjusted by loosening the clamp 122 and sliding the clamp 122 and fastener 16A horizontally along the block 116, in order to align the fastener 16A with a tube 90 in the top tubesheet 18. As discussed earlier, threading the bolt 34 into the nut 36 expands the flexible rubber element 30 to releasably lock the fastener 16A onto the tube 90. As shown in FIG. 9, one or more fasteners 16A may be used to secure the sheet 112 onto the top tubesheet 18.

Referring now to FIGS. 9 and 11, a connector channel 114 may be used to splice a full length of the sheet 112 to a short extension sheet 112' (which is also made of the same shape of "C" channel) when it is desirable to ensure that the dam arrangement 110 extends fully to the edge of a tubesheet, for instance. The connector channel 114 has in inside height that is slightly larger than the outside height of the sheets 112, 112' so it wraps around the two sheets that it is connecting. Of course, a similar connector channel 114 may be used to splice together two sections of "C" channel 112.

As may be appreciated in FIG. 11, the connector channel 114 defines two slotted openings 124 in addition to the regular through openings 126. The connector channel 114 is secured to the "C" channel 112 via bolts 130 through the openings 126. It is also secured to the extension "C" channel 112' via bolts 130 through the slotted openings 124 such that the extension "C" channel 112' may be slidably adjusted to extend or contract as required to extend to the edge of the tubesheet. FIG. 11 shows the extension "C" channel 112' in the extended position and, in phantom, in a contracted position.

FIGS. 9 and 10 further show a mat 128, such as a rubber mat, which is placed over the tubes 90 of the top tubesheet 18 which are not being filled with catalyst at the time. This protects the tubes 90 under the mat 128 from any foreign matter, including any catalyst, which may be dropped by a member of the crew working on the reactor. In this embodiment, the edge of the mat 128 extends under the sheet 112, such that the mat 128 is held in place by the sheet 112 (and by the fasteners 16A and blocks 116) and serves as a gasket between the sheet 112 of the dam and the tubesheet 18.

As discussed earlier, it may be desirable to use a tool, such a broom or squeegee for instance, to brush the catalyst into the tubes 90, as opposed to kneeling down on the rubber mats 128 and hand brushing the catalyst into the tubes 90. Hand brushing while kneeling on the tubesheet not only is very tiring, but it also applies uneven pressure to the particles as they are being brushed into the tubes 90, which tends to lead to more degradation and damage to the friable and fragile particles which results in inconsistent loading of the tubes 90.

To load particles into the tubes 90 of a reactor vessel, a first area of the upper tubesheet 18 is selected to be loaded. Loading sleeves may be inserted into the tubes in the first area, or templates may be placed on top of the tubes in the first area, if desired. Outside of the first area, one or more mats 128 are laid over the top surface of the tubesheet 18 to cover all or at least some of the tubes 90 which lie outside the first area. A dam arrangement 110 (or dam arrangement 10 or a combination thereof as in FIG. 9 is temporarily installed to define a border of the first area. In the arrangement of FIG. 9, the dam arrangement rests on the edge of the mat 128 such that the mat 128 serves as a gasket between the bottom of the dam arrangement and the tubesheet 18, which helps ensure that no particles pass between the bottom of the dam and the tubesheet as well as helping ensure that the mat remains in its proper position. Catalyst particles (or other particles) are then poured onto the first area of the tubesheet 18 and are brushed over the tubesheet 18, causing the particles to fall into the vertical reactor tubes 90. In the arrangement shown in FIG. 9, the particles are poured first onto the two quadrants that are not covered by the mats 128 and are brushed across the tubesheet 18 in those two quadrants. Once the tubes 90 in the first area have been filled with the particles, the dam arrangement is removed and any sleeves or templates that were used also are removed.

Then, the mats 128 are removed from the two quadrants they had been covering and are placed over the two quadrants that have already been filled with particles. The dam arrangement is then installed over the edges of the mats 128 to define a border of the second two quadrants. Again, the dam rests on the edge of the mat 128. Again, loading sleeves or templates may be put into position in the second two quadrants, if desired, and the particles are then poured onto the two quadrants of the tubesheet 18 that are now uncovered, and the particles are brushed over the tubesheet 18, causing the particles to fall into the vertical reactor tubes 90.

In FIG. 9, the mat 128 on the lower left quadrant of the tubesheet 18 is shown with seam lines 132. In this embodiment, the mat 128 is made from a number of strips which are joined together in an abutting relationship. The strips can be joined together by duct tape, for instance along the seams lines 132. The strips are likely easier to handle and to introduce into the top dome of the reactor than a one-piece mat. The shape of the strips of mat is such that the strips can be reused for any size tubesheet 18. A small tubesheet 18 may require only the innermost triangular piece and one other isosceles-trapezoidal piece. Larger tubesheets 18 may require additional isosceles-trapezoidal pieces.

It will be obvious to those skilled in the art that various modifications may be made to the embodiments described above without departing from the scope of the present invention.

What is claimed is:

1. A method for loading particles into the vertical tubes of a shell and tube chemical reactor having an upper tubesheet defining a plurality of openings and a plurality of vertical reactor tubes extending downwardly from the openings in the upper tubesheet, comprising the steps of:

selecting a first area on the upper tubesheet into which the particles are to be loaded;

installing a temporary dam to define a border of the first area, said temporary dam including a sheet having a bottom edge adjacent to the upper tubesheet and projecting upwardly from the bottom edge a distance of at least six times the largest dimension of the particles;

laying at least one mat on the top surface of the upper tubesheet to cover tubes that lie outside of the first area;

pouring the particles onto the first area of the upper tubesheet;

brushing the particles over the upper tubesheet within the first area, wherein an edge of the mat lies between the temporary dam and the upper tubesheet and serves as a gasket to prevent particles from passing between the temporary dam and the tubesheet as the particles are being brushed along the tubesheet in the first area; and causing the particles to fall into the vertical reactor tubes; and then, after the particles have been loaded into the vertical reactor tubes, removing the temporary dam;

wherein the temporary dam includes a plurality of said sheets, which are thin and flat, and the step of installing the temporary dam includes the steps of placing a plurality of blocks spaced apart in a desired arrangement resting on top of the tubesheet;

releasably securing the blocks to the tubesheet;

extending said thin, flat sheets between the blocks, with the ends of the sheets very close together, the bottom edges of the sheets adjacent to the tubesheet, and the sheets projecting upwardly from the tubesheet; and securing the sheets to the blocks.

2. A method for loading particles into the vertical tubes of a shell and tube chemical reactor as recited in claim 1, wherein the step of releasably securing the blocks to the tubesheet includes using magnets on the blocks which are attracted to the metal tubesheet.

3. A method for loading particles into the vertical tubes of a shell and tube chemical reactor as recited in claim 1, wherein the step of releasably securing the blocks to the tubesheet includes inserting releasable fasteners extending from the blocks into the openings in the tubesheet.

4. A method for loading particles into the vertical tubes of a chemical reactor as recited in claim 3, wherein the step of releasably securing the blocks to the tubesheet further includes expanding the releasable fasteners against the inner walls of the respective openings in the tubesheet.

5. A method for loading particles into the vertical tubes of a chemical reactor as recited in claim 1, wherein at least one of said thin, flat sheets is more flexible than the block to which it is secured.

6. A method for loading particles into the vertical tubes of a chemical reactor as recited in claim 2, wherein the magnets are biased by a biasing means to allow the magnets to move relative to their respective blocks in a direction substantially perpendicular to the tubesheet.

7. A method for loading particles into the vertical tubes of a chemical reactor as recited in claim 1, and further comprising the step of inserting loading sleeves into the tubes in the first area before pouring catalyst into the first area.

* * * * *